United States Patent
Torno et al.

(10) Patent No.: US 7,630,825 B2
(45) Date of Patent: Dec. 8, 2009

(54) METHOD FOR MONITORING A KNOCK CONTROL, AND DEVICE FOR KNOCK CONTROL OF AN INTERNAL COMBUSTION ENGINE

(75) Inventors: Oskar Torno, Schwieberdingen (DE); Carsten Kluth, Stuttgart (DE); Werner Haeming, Neudenau (DE); Taskin Ege, Markgroeningen (DE); Federico Buganza, Stuttgart (DE); Erkan Danisman, Kernen (DE); Geetha Srinivasan, Karnataka (IN)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 11/985,700

(22) Filed: Nov. 14, 2007

(65) Prior Publication Data
US 2008/0167792 A1    Jul. 10, 2008

(30) Foreign Application Priority Data
Nov. 14, 2006   (DE) .................. 10 2006 053 483

(51) Int. Cl.
*F02D 45/00*    (2006.01)
*F02D 41/00*    (2006.01)

(52) U.S. Cl. ...................................... 701/111
(58) Field of Classification Search .............. 701/111, 701/102, 114; 123/406.21, 406.37; 73/35.04, 73/117.3
See application file for complete search history.

(56) References Cited

U.S. PATENT DOCUMENTS

| 5,040,510 A | * | 8/1991 | Krebs et al. | ............ | 123/406.37 |
| 5,321,973 A | * | 6/1994 | Sogawa | ............ | 123/406.37 |
| 6,857,416 B2 | * | 2/2005 | Honda | ............ | 123/406.21 |

FOREIGN PATENT DOCUMENTS

DE        10022815        11/2001
JP    2005-188297 A  *   7/2005

* cited by examiner

*Primary Examiner*—Hieu T Vo
(74) *Attorney, Agent, or Firm*—Kenyon & Kenyon LLP

(57) ABSTRACT

A method for monitoring a knock control and a device for knock control of an internal combustion engine are provided, in which digital knock data are obtained for the knock control in that the acquisition of data of a knock sensor, converted from analog to digital, is started at a start angle of the internal combustion engine and ended at an end angle. The digital knock data are evaluated so as to detect a malfunction in the acquisition of the digital knock data.

10 Claims, 1 Drawing Sheet

METHOD FOR MONITORING A KNOCK CONTROL, AND DEVICE FOR KNOCK CONTROL OF AN INTERNAL COMBUSTION ENGINE

BACKGROUND INFORMATION

German Patent Application No. DE 100 22 815 describes a device in which the signal of a knock sensor is converted from analog to digital and the further processing of the knock data is then implemented on the basis of these digital data. Monitoring of the knock control is provided as well, which is based on the feeding of test signals and a check as to whether a corresponding knock level that matches these test signals is produced. Evaluation of the digital knock data for monitoring purposes is not provided.

SUMMARY OF THE INVENTION

The method according to the present invention for monitoring a knock control, and the device according to the present invention for knock control of an internal combustion engine have the advantage over the related art that monitoring of the knock control is implemented by direct evaluation of the digital knock data. In this manner monitoring of the knock control is able to be carried out during continuous operation of the internal combustion engines, without interrupting the knock control, by the application of test signals. Thus, the operational reliability of the internal combustion engine is improved.

The start and the end of the data acquisition are implemented by a comparison unit, which compares an instantaneous angle information with previously calculated start angles and end angles for the data acquisition. In addition to the angle information, the calculation of a data quantity requires knowledge of a rotational speed of the internal combustion engine. With the aid of this information, a length of time for the acquisition of the data is first calculated in an especially simple manner and the data quantity then calculated therefrom. It is also possible to use an average value for the rotational speed as engine-speed information. As additional monitoring, a counter may be modified upon each start or end of the data acquisition. This counter will then be checked independently of an angle information, i.e., at specified time intervals. Such a type of monitoring is independent of a device that supplies the instantaneous angle information of the internal combustion engine and consequently can also not be affected by a faulty determination of the angle information. As a further form of monitoring, a check may additionally be carried out upon the occurrence of an end angle as to whether a start angle of a subsequent cylinder of the internal combustion engine lies after the end angle.

DETAILED DESCRIPTION

Figure 1:
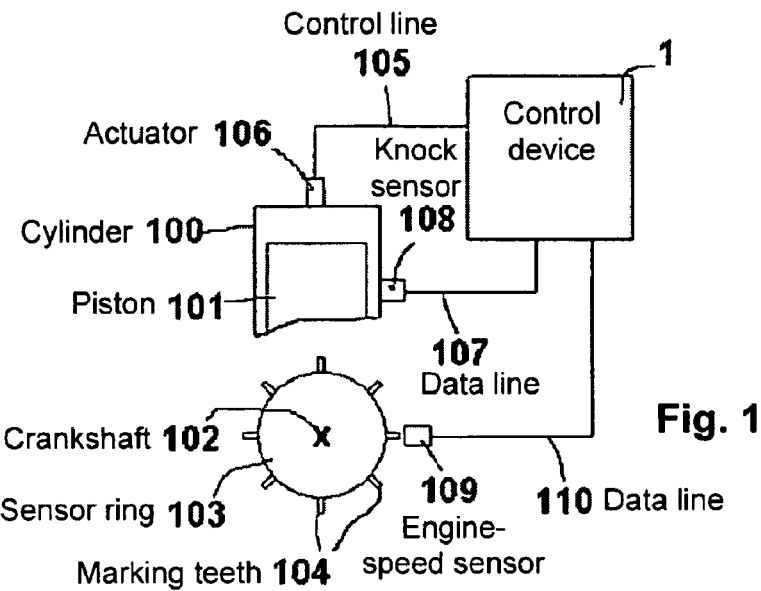
FIG. 1 shows a schematic view of an internal combustion engine having a control device.

FIG. 1 shows an internal combustion engine and a control device 1 assigned to the internal combustion engine in highly schematized form. The internal combustion engine is represented by a cylinder 100 inside which a piston 101 is disposed. A combustion in cylinder 100 causes a pressure increase, which effects a displacement of piston 101. A connecting rod (not shown further) converts this motion of piston 101 into a motion of a crankshaft 102. A sensor ring 103 on which individual marking teeth 104 have been provided is rigidly connected to crankshaft 102. FIG. 1 schematically shows eight teeth. However, as a rule, sensor rings 103 have thirty or sixty teeth, one or two of these teeth not being embodied in order to mark a fixed reference point that corresponds to a permanently specified angle position of crankshaft 102.

The control of the internal combustion engine is performed by control device 1, which actuates actuators for the control of the internal combustion engine and reads in the signals from sensors that supply information regarding states of the internal combustion engine. A control line 105, by which control device 1 controls an actuator 106 on top of cylinder 100 is shown in FIG. 1 as one example. Such an actuator 106 may be a spark plug or a fuel injector, for instance, by which either an ignition of the air-fuel mixture already carried into cylinder 100 is implemented, or by which a corresponding quantity of fuel is injected. Furthermore, two different sensors are shown in FIG. 1 as examples.

A knock sensor 108 on the outside of cylinder 100 records corresponding vibration signals in cylinder 100 and forwards them via a data line 107 to control device 1. With the aid of these knock signals, a so-called knock control is realized, i.e., an operation of the internal combustion engine in direct proximity to the knock limit, thereby allowing an especially economical operation of the internal combustion engine.

With the aid of engine-speed sensor 109, a sliding of marking teeth 104 along engine-speed sensor 109 is detected, and signals, which are proportional to the particular position of crankshaft 102, are thereby provided in control device 1 via data line 110. This information allows internal combustion engine 1 to carry out interventions in an angle-synchronous manner, i.e., to implement actuating interventions at the actuators at specific positions of the crankshaft of the internal combustion engine. Only one cylinder 100 has been illustrated schematically in FIG. 1. However, conventional internal combustion engines usually have a plurality of cylinders 100, in particular four cylinders 100.

Figure 2:
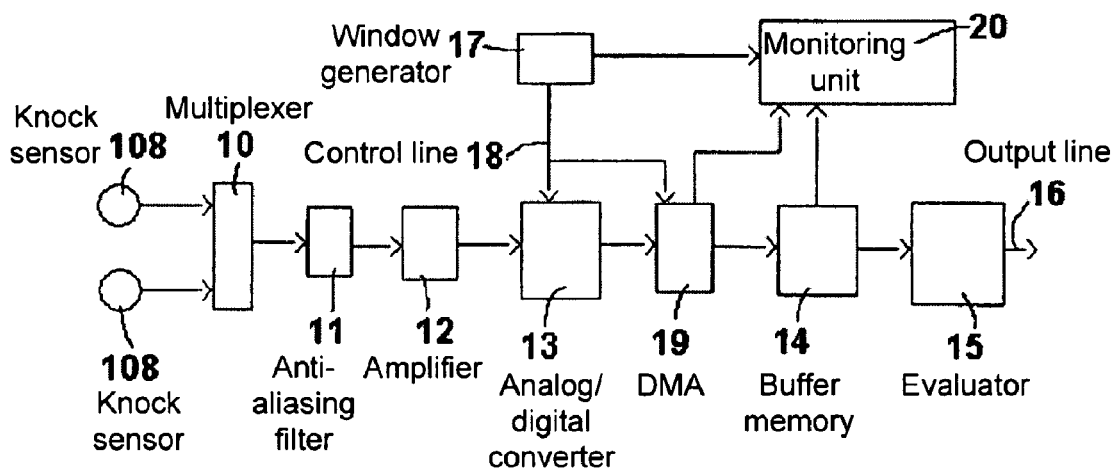
FIG. 2 shows various means for evaluating knock signals, and means for monitoring the knock control.

FIG. 2 elucidates the signal processing of a knock control in greater detail. The signals from two knock sensors 108, which are assigned to a plurality of cylinders of an internal combustion engine, are routed via a multiplexer 10, which always switches through one sensor signal only. This is possible because the knock signals in the cylinders of an internal combustion engine do not occur at the same time and thus do not overlap in time. Multiplexer 10 forwards the data flow of the knock sensors combined in this manner to a filter 11. This filter 11 has an anti-aliasing function in order to prevent the occurrence of interference effects caused by sampling at a limited frequency. An additional signal amplification takes place in amplifier stage 12 downstream from this filter 11, and this amplified signal is forwarded to an analog-digital converter. The analog knock signal is then sampled in this analog/digital converter, and corresponding sampling values are stored in a buffer memory 14. The storing in memory 14 is implemented by a direct-memory access module 19 (DMA). The sampling values of the knock signal stored in buffer memory 14 thereupon are processed in blocks in an evaluator 15; in particular, it is determined in this manner whether or not a knocking combustion is taking place at a specific combustion in one of the cylinders to which knock sensors 108 have been assigned. A corresponding output signal is then also made available at an output line 16.

The relevant measuring window in which the analog/digital conversion by analog/digital converter 13 takes place, is specified by a window generator 17. This window generator 17 is connected to analog/digital converter 13 via a corresponding control line 18. In response to a corresponding signal from window generator 17, analog/digital converter 13 begins with the analog/digital conversion, and each of the sampling values of the knock signal from knock sensors 108 generated in this manner is stored in buffer memory 14. If the data acquisition then is no longer to take place, window generator 17 stops the analog/digital conversion by analog/digital converter 13. The corresponding signals from window generator 17 are also forwarded to a monitoring unit 20, which monitors the entire knock control. Furthermore, monitoring unit 20 also has the data of buffer memory 14 or the data of evaluation unit 15 in readiness.

FIG. 2 shows the means for processing the knock signals and the monitoring units as individual, separate functional blocks. However, these individual functional blocks may also be grouped together with control device 1 in a housing, and they may also be partially realized by a corresponding program, which is executed by a multifunction controller of control device 1. In particular the functional blocks that are post-connected to analog/digital converter 13 are preferably realized by corresponding program modules which are processed by a multifunction controller of a control device 1.

Control device 1 is designed to process angle-controlled and time-controlled processes. Angle-controlled processes are processes that are meant to occur at a particular angular position of crankshaft 102 of the internal combustion engine. To this end, control device 1 analyzes the signal from engine-speed sensor 109. Assuming sixty teeth on a ring sensor 103, an angular resolution of 6° crankshaft angle may be realized in this way. Since the rotational speed of an internal combustion engine does not change randomly within 6°, intermediate values are able to be calculated in a corresponding manner, based on an instantaneous engine-speed signal and the occurrence of a tooth 104. For instance, an angle counter by which an angular resolution of below 1°, such as 0.75°, arc of crankshaft rotation is realized within control device 1 is normal. A corresponding program module checks for each of these angles whether an activation of components of the internal combustion engine or control device 1 is to be implemented in connection with the angle. In this manner the functionality of window generator 17 is produced, in that an angle information is provided for the start of the data acquisition and an angle information for the end of the data acquisition of the signals from knock sensors 108. This calculation is normally carried out in conjunction with the calculation of the ignition angle since a useful acquisition of knock data is meaningful within a particular angle window following ignition. Thus, in addition to the ignition angle, a start angle and an end angle is calculated for each ignition event for the acquisition of knock data. The window generator receives values for this start angle and end angle and the information regarding the instantaneous position of crankshaft 102 of the internal combustion engine, i.e., the instantaneous angle information, within control device 1. If window generator 17 determines that the instantaneous angle corresponds to the start angle, then the analog/digital converter is turned on, and if the window generator subsequently determines that the end angle is reached, then the analog/digital conversion by analog/digital converter 13 is stopped again. As an alternative, analog/digital converter 13 may also be operated continuously and only the storing in buffer memory 14 be controlled by window generator 17. In this case, DMA 19 evaluates the control signals of window generator 17. In FIG. 2, control line 18 is connected both to analog/digital converter 13 and to DMA 19. Depending on which module is being used to generate the measuring windows, one of the two lines is not required.

Monitoring unit 20 then checks whether the analog/digital conversion by analog/digital converter 13 was successful and whether correct storing into buffer memory 14 is taking place. An additional device is provided for this purpose, in particular an additional program module, which is triggered independently of the start angle or the end angle of the acquisition of the data. For monitoring the knock-data acquisition, monitoring unit 20 may utilize both signals from window generator 17 and buffer memory 14 or evaluator 15. At any rate, monitoring unit 20 has access to the digital knock data stored in buffer memory 14 and analyzes these data directly in order to detect a malfunction in the acquisition of the digital knock data. Due to the direct evaluation of the data converted from analog to digital, monitoring parallel to the continuous operation of the knock control is possible. It is not necessary to use test signals and thereby interrupt the continuous knock control or knock detection. However, this requires that the evaluation be performed directly on the basis of the digital data.

In a first monitoring by monitoring unit 20, the data quantity stored in buffer memory 14 is evaluated. A specific minimum quantity of data must be stored in buffer memory 14 for each knock event in order to allow a meaningful analysis to be carried out to begin with. A first simple evaluation consists of checking the data quantity generated in buffer memory 14 with regard to a specific measuring window. Furthermore, it may also be considered in this context whether these measured values have sufficient signal height and whether sufficient variations of the digital knock data are present.

In conjunction with an engine speed information, the expected data quantity of a particular knock window is able to be calculated with good approximation. This is accomplished in an especially uncomplicated manner if, starting from the start angle and end angle and the rotational speed of the internal combustion engine, a length of time is calculated that is available for the analog/digital conversion. Along with the known sampling frequency of analog/digital converter 13, it is then possible to calculate as a good approximation the size of the data block that is stored in buffer memory 14 in connection with the knock window. The more precise the consideration of the rotational speed information, the more precise the calculation of the size of the data block in buffer memory 14. For instance, it is useful to utilize the rotational speed at the start angle and the end angle for the calculation of an average value of the rotational speed, and to use the rotational speed, averaged in this manner, to calculate the data quantity. Excessive deviations from the data quantity calculated in this manner then allow inferences regarding malfunctions of either window generator 17 or analog/digital converter 13. The advantage of this monitoring method is that is may be carried out in parallel to the normal evaluation of the knock data. It is not necessary to apply a test signal to the signal-processing chain, since no knock detection is possible during such a test phase and thus no knock control either. It is especially advantageous for the monitoring if the triggering of this monitoring within the control device occurs independently of window generator 17. This may be accomplished by calculating not only the start angle and end angle, but a monitoring angle as well, for which the monitoring unit then implements a check of the data in buffer memory 14. As an alternative, monitoring unit 20 may also be activated in a time-controlled manner, i.e., a monitoring routine, which then checks the individual data quantity of the measuring window that occurred immediately previously, is checked at fixedly defined time intervals.

A special form of the time-controlled monitoring by monitoring unit 20 may consist of window generator 17 incrementing a start-angle counter at each start angle or an end-angle counter at each end angle. Monitoring unit 20 is activated at regular time intervals, these time intervals being selected in such a way that at least one evaluation window must have occurred since the last call-up of monitoring unit 20 at each meaningful rotational speed of the internal combustion engine. Given longer time periods, a correspondingly larger number of measuring windows that must have occurred since the last call-up of this monitoring routine may also be provided. Only if an appropriate number of counter values of the start-angle counter or the end-angle counter are found in the monitoring routine triggered in a time-controlled manner, will the knock detection be evaluated as fault-free.

Further monitoring may be performed together with the end angle. In the process, monitoring unit 20 checks whether, upon the occurrence of an end angle, a start angle that has a subsequent angle value with regard to the instantaneous end angle, is already stored in window generator 17 for the next measuring window. In particular in the case of 4-cylinder internal combustion engines, on overlap of the measuring windows of individual combustion processes in the cylinders is impossible. A check as to whether the end angles and start angles of successive combustion processes are plausible with regard to each other thus constitutes a check of the calculations of window generator 17.

A further evaluation by monitoring unit 20 provides that the end result, which was calculated by evaluator 15 and output via line 16, is forwarded to monitoring unit 20 as well. In a real internal combustion engine this output signal always has a certain minimum height if the entire evaluation chain is functioning properly. By checking whether the output value is lying within a certain signal window, it is therefore possible to determine whether a complete malfunction of a component or an interruption of a connection line has occurred.

A further check is performed by checking DMA 19 with the aid of a self-test. DMA 19 checks the storage process into memory 14, in particular whether DMA 19 was able to perform a memory access to memory 14 before a new digital value was made available by analog/digital converter 13. If a fault occurs in the process, then the DMA will set a corresponding fault bit. By checking this fault bit, monitoring unit 20 is able to determine whether the acquisition (and storing) of the knock data is being carried out correctly. If the other components of the evaluation chain, such as multiplexer 10, anti-aliasing filter 11, or analog/digital converter 13 are equipped with self-testing as well, then the results of these self-tests may also be used to detect fault in the acquisition of the knock data, like in the case of DMA 19.

Further monitoring is performed in that the activity of analog/digital converter 13 and/or DMA 19 is monitored with regard to an activity between the measuring windows. For no data are allowed to be written into memory 14 between the measuring windows. Monitoring unit 20 therefore checks whether analog/digital converter 13 is at rest following the end of a measuring window (variant including window formation by control of analog/digital converter 13), or whether DMA 19 is at rest (variant including window formation by control of DMA 19).

What is claimed is:

1. A device for knock control of an internal combustion engine, comprising:
   a data-acquisition device for obtaining digital knock data, which begins an acquisition of data of a knock sensor, converted from analog to digital, at a start angle of the internal combustion engine and ends it at an end angle; and
   a monitoring device for detecting a malfunction in the acquisition of the digital knock data and for evaluating the digital knock data.

2. A method for monitoring a knock control of an internal combustion engine, comprising:
   obtaining digital knock data for the knock control in that a detection of data of a knock sensor, converted from analog to digital, is started at a start angle of the internal combustion engine and ended at an end angle; and
   evaluating the digital knock data in order to detect a malfunction in an acquisition of the digital knock data.

3. The method according to claim 2, wherein an angle counter is provided in that an instantaneous angle information of the internal combustion engine is available, and a comparison unit implements a comparison of the instantaneous angle information and the start angle and the end angle, and begins and ends the acquisition as a function of the comparison.

4. The method according to claim 2, further comprising, following the acquisition of the digital knock data, calculating a data quantity based on the start angle, the end angle and a rotational speed of the internal combustion engine, which is compared to an actually stored data quantity.

5. The method according to claim 4, further comprising, based on the start angle, the end angle, and the rotational speed of the internal combustion engine, calculating a length of time of the acquisition of the knock data and, therefrom, the data quantity.

6. The method according to claim 4, wherein, for the rotational speed, an item of rotational speed information at the start angle is taken into account, and an item of rotational speed information at the end angle.

7. The method according to claim 2, further comprising incrementing a start-angle counter at each start angle, and/or an end-angle counter at each end angle, and checking a reading of the start-angle counter and/or the end-angle counter at specified time intervals.

8. The method according to claim 2, further comprising, upon an occurrence of an end angle, checking whether the start angle of a subsequent cylinder of the internal combustion engine lies after the end angle.

9. The method according to claim 2, wherein a plurality of processing devices are provided for sensor signals, at least one of the processing devices being able to perform a self-test, and further comprising checking whether all of the processing devices that are able to perform a self test are free of faults.

10. The method according to claim 2, further comprising storing the data of the knock sensor, converted from analog to digital, in a memory, and checking after an end angle and prior to a start angle whether data are still being stored into the memory.

\* \* \* \* \*